(12) United States Patent
Nakura (10) Patent No.: US 6,893,161 B2
(45) Date of Patent: May 17, 2005

(54) OPTICAL CONNECTOR DEVICE

(75) Inventor: Yuji Nakura, Aichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 40 days.

(21) Appl. No.: 10/298,672

(22) Filed: Nov. 19, 2002

(65) Prior Publication Data

US 2003/0099441 A1 May 29, 2003

(30) Foreign Application Priority Data

Nov. 20, 2001 (JP) ........................................ 2001-354604

(51) Int. Cl.[7] ................................................. G02B 6/36
(52) U.S. Cl. ........................................... 385/58; 385/53
(58) Field of Search .............................. 385/53, 58, 88, 385/92

(56) References Cited

U.S. PATENT DOCUMENTS 5,717,801 A * 2/1998 Smiley ........................ 385/60
6,227,719 B1 * 5/2001 Aoki et al. ................... 385/59
6,454,463 B1 * 9/2002 Halbach et al. ............... 385/60
6,464,403 B1 * 10/2002 Koch et al. ................... 385/53

FOREIGN PATENT DOCUMENTS

JP       A 10-10366       1/1998
JP     A 2001-126809       5/2001

* cited by examiner

Primary Examiner—Michael G. Lee
Assistant Examiner—Jamara A. Franklin
(74) Attorney, Agent, or Firm—Oliff & Berridge, PLC (57) ABSTRACT

An optical connector device to be used in the field of optical communication between equipments in an office automation system, a factory automation system, an automobile and so on. In this optical connector device, a fitting projection portion of a plug-type optical connector is fitted in a fitting recess in a socket-type optical connector. A latch portion, formed at the plug-type optical connector, is releasably and retainingly engaged with a latch retaining portion formed at the socket-type optical connector. An auxiliary lock mechanism is provided between an inner peripheral surface of the fitting recess and an outer peripheral surface of the fitting projection portion. The auxiliary lock mechanism includes a lock recess and a lock projection which are releasably fitted together when the latch portion is to be engaged with the latch retaining portion.

6 Claims, 7 Drawing Sheets

OPTICAL CONNECTOR DEVICE

BACKGROUND OF THE INVENTION

1. Field of the Invention

This invention relates to an optical connector device to be used in the field of optical communication between equipments in an OA (office automation) system, a FA (factory automation) system, an automobile and so on.

2. Background Art

Figure 14:
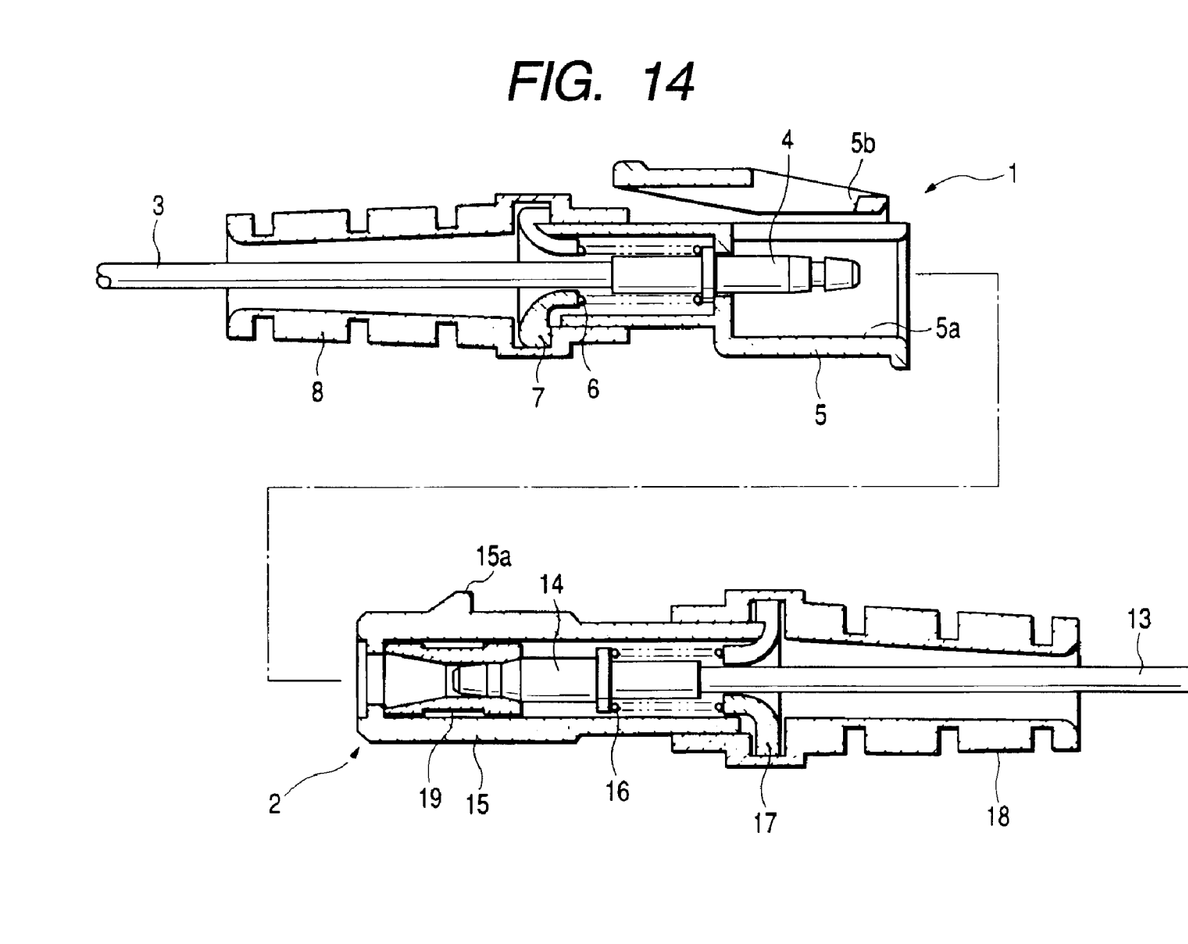
FIG. 14 is a cross-sectional view showing a conventional example.

One example of optical connector devices, currently used in an automobile, is shown in FIG. 14, and this connector device includes a socket-type optical connector 1 and a plug-type optical connector 2 which can be releasably connected together. The socket-type optical connector 1 includes a metal ferrule 4, mounted on an end portion of an optical fiber cord 3 to hold an end portion of an optical fiber, a socket-type housing 5, which receives the metal ferrule 4, and holds this metal ferrule 4 in a predetermined posture, a coil spring 6, which is mounted within the socket-type housing 5 to resiliently urge the metal ferrule 4 in a predetermined direction, a spring retainer 7, which is mounted at an end portion of the socket-type housing 5 to retain the coil spring 6 against withdrawal, and a boot 8 which is mounted on the end portion of the socket-type housing 5, and extends from this end portion to cover the optical fiber cord 3.

Generally similarly, the plug-type optical connector 2 mainly includes a metal ferrule 14, mounted on an end portion of another optical fiber cord 13 to hold an end portion of an optical fiber, a plug-type housing 15, which receives the metal ferrule 14, and holds this metal ferrule 14 in a predetermined posture, a coil spring 16, which is mounted within the plug-type housing 15 to resiliently urge the metal ferrule 14 in a predetermined direction, a spring retainer 17, which is mounted at an end portion of the plug-type housing 15 to retain the coil spring 16 against withdrawal, and a boot 18 which is mounted on the end portion of the plug-type housing 15, and extends from this end portion to cover the optical fiber cord 13.

The plug-type housing 15 of the plug-type optical connector 2 is formed into a narrow, elongate tubular shape, and a sleeve member 19 is received within this housing, and a front end portion of the metal ferrule 14 is fitted in this sleeve member, so that this sleeve member holds the metal ferrule 14 in the predetermined posture.

When the front end portion of the plug-type housing 15 is fitted into a fitting recess 5a in the socket-type housing 5, a retaining portion 15a, formed on an outer peripheral surface of the plug-type housing 5 at the front end portion thereof, is releasably and retainingly engaged with a retaining portion 5b formed on the socket-type housing 5, so that the two housings are connected together. At this time, the front end portion of the metal ferrule 4 is fitted into the other end portion of the sleeve member 19, so that the two optical fiber cords 3 and 13 are optically coupled together.

In this conventional optical connector device, the metal ferrules 4 and 14, as well as the housings 5 and 15, are independent, and these independent metal ferrule 4 and 14 are forcibly abutted against each other by the resilient forces of the coil springs 6 and 16, thereby providing the connector-connected condition which is less liable to be affected by the fitted condition of the retaining portions 5b and 15a formed respectively on the socket-type housing 5 and plug-type housing 15. However, the number of the component parts, including the metal ferrules 4 and 14, the coil springs 6 and 16 and the spring retainers 7 and 17, is large, and therefore there has been encountered a problem that the assembling operation requires much time and labor, and is cumbersome.

Therefore, there has been proposed the type of optical connector device in which a ferrule portion for holding an end portion of an optical fiber is formed integrally with each of a socket-type optical connector and a plug-type optical connector in order to reduce the number of the component parts and to reduce the time and labor for the assembling operation. In such an optical connector device, when a fitting projection portion of the plug-type optical connector is fitted into a fitting recess in the socket-type optical connector, a latch portion, provided at the plug-type optical connector, is releasably and retainingly engaged with a latch retaining portion, provided at the socket-type optical connector, and therefore the end surfaces of the two optical fibers are connected together in a butting manner, so that the two optical fiber cords are optically coupled together.

In this kind of optical connectors, there is used the system in which the end surfaces of the optical fibers are connected together in a butting manner, thereby securing a passage for light, and therefore a light loss, developing in the connected condition of the optical connectors, is much influenced by the butt-connected condition of the optical fiber end surfaces.

In the structure of connecting the socket-type and plug-type optical connectors each having the integral ferrule portion, the latch portion can be elastically deformed and moved to be releasably and retainingly engaged with the latch retaining portion, and therefore a relative shaking movement between the two optical connectors is liable to occur in the connected condition. There has been encountered a problem that the dimensional tolerances must be strictly controlled in order to stabilize and reduce the light loss in the connected condition.

SUMMARY OF THE INVENTION

With the above problems in view, it is an object of this invention to provide an optical connector device in which a relative shaking movement in a connected condition is prevented so as to stabilize a light loss.

Technical means for solving the above problems is directed to an optical connector device wherein a fitting projection portion of a plug-type optical connector is fitted in a fitting recess in a socket-type optical connector, and a latch portion, formed at the plug-type optical connector, is releasably and retainingly engaged with a latch retaining portion formed at the socket-type optical connector; and wherein an auxiliary lock mechanism is provided between an inner peripheral surface of the fitting recess and an outer peripheral surface of the fitting projection portion, and the auxiliary lock mechanism includes a lock recess and a lock projection which are releasably fitted together when the latch portion is retainingly engaged in the latch retaining portion.

Preferably, the lock recess and the lock projection of the auxiliary lock mechanism have such an automatically-fitting structure that the lock recess and the lock projection are led in the mutually-fitting direction at the time when the operation of retaining engagement between the latch retaining portion and the latch portion is completed.

Preferably, a length of the lock projection in the direction of fitting of the fitting projection portion is larger than a length of the lock recess.

Preferably, a front portion of the lock projection with respect to the direction of fitting of the fitting projection portion is gently slanting while a rear portion of the lock projection with respect to the direction of fitting of the fitting projection portion is abruptly slanting.

DETAILED DESCRIPTION OF THE PREFERRED EMBODIMENTS

A first embodiment of the present invention will now be described with reference to the drawings. As shown in FIGS. 1 to 4, an optical connector device includes a plug-type optical connector 31 for holding end portions of optical fiber cords 30, and a socket-type optical connector 34 for holding end portions of optical fiber cords 33 to be optically coupled respectively to the optical fiber cords 30. When the plug-type optical connector 31 and the socket-type optical connector 34 are connected together, the optical fiber cords 30 are optically coupled respectively to the optical fiber cords 33.

Each of the optical fiber cords 30 and 33 includes an optical fiber 30a, 33a (comprising a core and a cladding), and a sheath 30b, 33b formed on an outer periphery of the optical fiber to cover the same. When the optical fiber cord is to be held in the plug-type optical connector 31 or the socket-type optical connector 34, the sheath 30b, 33b is beforehand removed from the end portion of the optical fiber cord 30, 33 over a predetermined length, so that the optical fiber 30a, 33a within the optical fiber cord is exposed.

Figure 2:
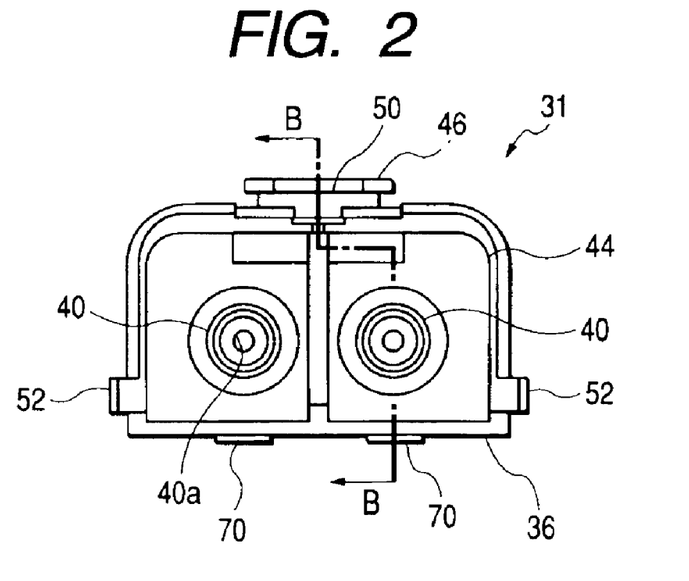
FIG. 2 is an end view of a plug-type optical connector of the first embodiment.
Figure 3:
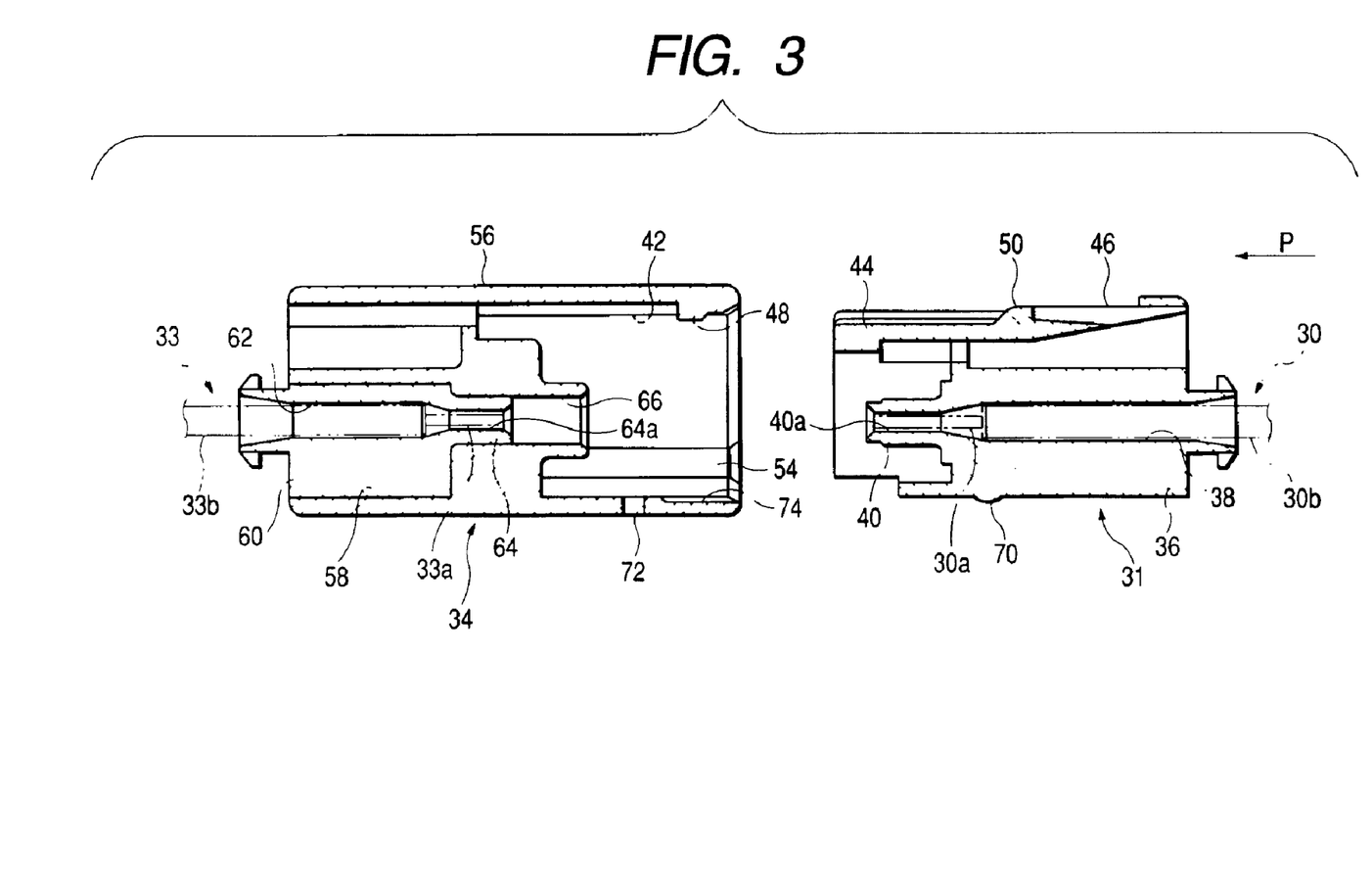
FIG. 3 is a view explanatory of a fitting operation, showing the cross-section of the socket-type optical connector taken along the line A—A of FIG. 1 as well as the cross-section of the plug-type optical connector of FIG. 2 taken along the line B—B of FIG. 2.

The plug-type optical connector 31 mainly includes a housing body 36 of a generally square tubular shape made of an elastic resin or the like, and cord receiving hole portions 38, into which the optical fiber cords 30 are inserted and received, respectively, in the axial direction, are formed in this housing body 36.

Ferrule portions 40 of a generally cylindrical tubular shape each for holding the corresponding optical fiber 30a, exposed at the end portion of the optical fiber cord 30, are formed integrally at a front end of the housing body 36 (at which the end portions of the optical fiber cords 30, inserted in the respective cord receiving hole portions 38, are disposed), and project forwardly from this front end, and an optical fiber receiving hole portion 40a is formed in each ferrule portion 40.

A surrounding wall portion is formed on the housing body 36, and surrounds the ferrule portions 40 in suitably-spaced relation to outer peripheral surfaces thereof, and this surrounding wall portion forms a fitting projection portion 44 which can be releasably fitted into a fitting recess 42 formed in the socket-type optical connector 34.

The inner diameter of the cord receiving hole portion 38 is so sized as to pass the sheath 30b of the optical fiber cord 30 therethrough, and the inner diameter of the optical fiber receiving hole portion 40a is so sized as to pass the optical fiber 30a therethrough.

When each optical fiber cord 30 is inserted into the corresponding cord receiving hole portion 38 from the rear side to be received therein, the sheath 30b of the optical fiber cord 30 is received in the cord receiving hole portion 38 while the optical fiber 30a is received in the optical fiber receiving hole portion 40a. When the optical fiber 30a is thus received in the optical fiber receiving hole portion 40a, the optical fiber 30a is held in this hole portion in a radially-positioned manner. The end surface of the optical fiber 30a is suitably processed into a specular surface at the distal end of the ferrule portion 40.

The optical fiber cord 30, received in the cord receiving hole portion 38, is held therein against withdrawal by conventional means such as an adhesive or a suitable stopper structure.

An engagement extension piece portion 46 is formed on the upper side of the housing body 36, and extends rearward from the fitting projection portion 44 in a cantilever manner. A latch portion 50 is formed on the engagement extension piece portion 46 intermediate opposite ends thereof, and this latch portion 50 can be releasably and retainingly engaged with a latch retaining portion 48 formed within the fitting recess 42 of the socket-type optical connector 34. When the plug-type optical connector 31 and the socket-type optical connector 34 are to be connected together, the engagement extension piece portion 46 is elastically deformed downwardly so as to retainingly engage the latch portion 50 with the latch retaining portion 48.

Figure 1:
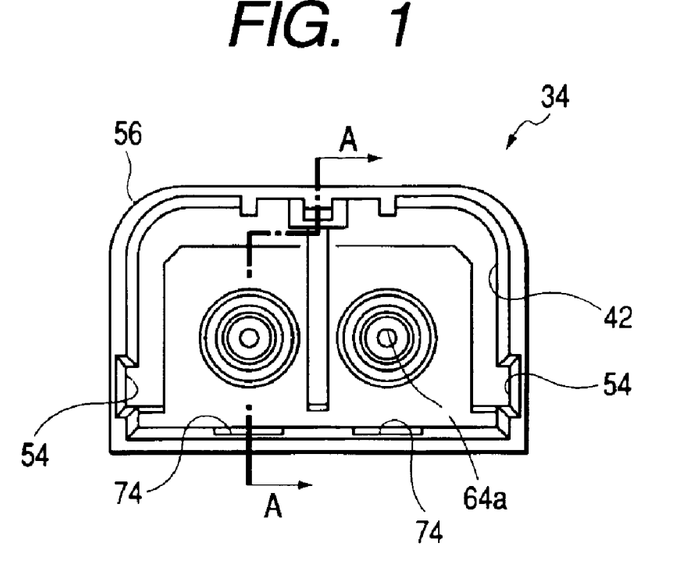
FIG. 1 is an end view of a socket-type optical connector of a first embodiment of the invention.

Guide ridges 52 are formed respectively on lower portions of opposite side surfaces of the housing body 36, and guide grooves 54 are formed respectively in lower portions of opposed side surfaces of the fitting recess 42, and during the time when the plug-type optical connector 31 and the socket-type optical connector 34 are connected together, the guide ridges 52 are slidingly guided by these guide grooves 54, respectively.

The socket-type optical connector 34, like the plug-type optical connector 31, is made of an elastic resin or the like, and mainly includes a housing body 56 of a generally square tubular shape made of an elastic resin or the like, and a fiber holding member 60 fitted in a receiving hole portion 58 in the housing body 56. The fitting recess 42 is formed in one end portion of the housing body 56, and the receiving hole portion 58 is formed in the other end portion thereof.

Cord receiving hole portions 62, into which the optical fiber cords 33 are inserted and received, respectively, in the axial direction, are formed in the fiber holding member 60. Ferrule portions 64 of a generally cylindrical tubular shape each for holding the corresponding optical fiber 33a, exposed at the end portion of the optical fiber cord 33, are formed integrally at that end of the fiber holding member 60 (at which the end portions of the optical fiber cords 33, inserted in the respective cord receiving hole portions 62, are disposed), and project forwardly from this end, and an optical fiber receiving hole portion 64a is formed in each ferrule portion 64.

The inner diameter of the cord receiving hole portion 62 is so sized as to pass the sheath 33b of the optical fiber cord 33 therethrough, and the inner diameter of the optical fiber receiving hole portion 64a is so sized as to pass the optical fiber 33a therethrough.

Ferrule portion-holding holes 66 of a circular shape are formed in an axially-central portion of the housing body 56, and the corresponding ferrule portion 40 of the housing body 36 and the corresponding ferrule portion 64 of the fiber holding member 60 can be fitted and received in each ferrule portion-holding hole 66.

When each optical fiber cord 33 is inserted into the corresponding cord receiving hole portion 62 from the rear side to be received therein, the sheath 33b of the optical fiber cord 33 is received in the cord receiving hole portion 62 while the optical fiber 33a is received in the optical fiber receiving hole portion 64a. When the optical fiber 33a is thus received in the optical fiber receiving hole portion 64a, the optical fiber 33a is held in this hole portion in a radially positioned manner. The end surface of the optical fiber 33a is suitably processed into a specular surface at the distal end of the ferrule portion 64.

The optical fiber cord 33, like the optical fiber cord 30, is held in the cord receiving hole portion 62 against withdrawal by suitable means such as an adhesive or a stopper structure.

In this condition, the fiber holding member 60 is mounted in the receiving hole portion 58, and in this mounted condition the ferrule portions 64 are fitted and held in one end portions of the ferrule portion-holding holes 66, respectively.

Figure 6:
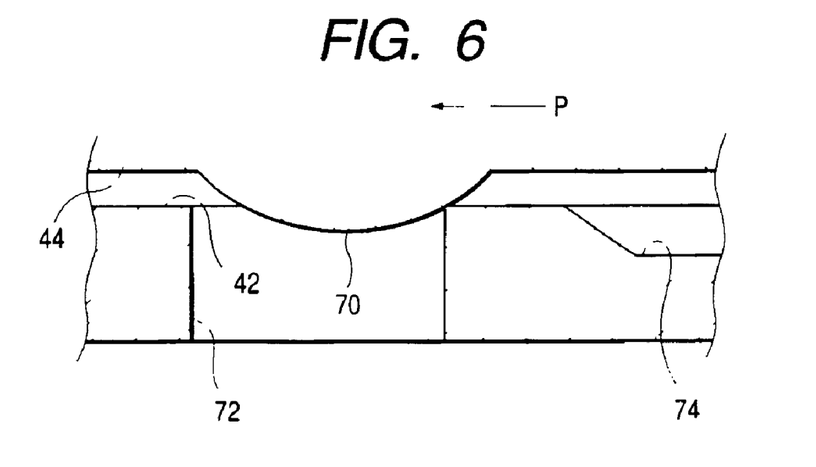
FIG. 6 is a cross-sectional view of a lock projection portion, showing a condition immediately before the operation of retaining engagement between the latch retaining portion and the latch portion is completed.
Figure 7:
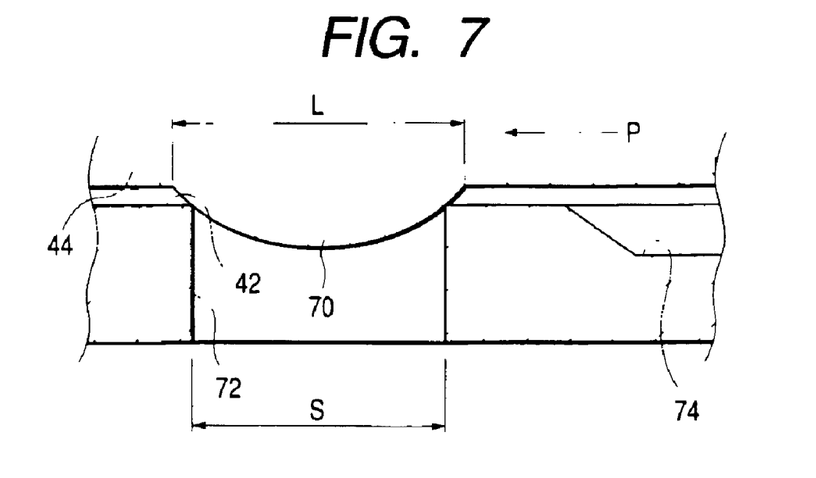
FIG. 7 is a cross-sectional view showing a condition in which the lock projection is fitted in a lock recess.

In this embodiment, lock projections 70, each bulging into an generally arcuate shape, are formed on the lower side of the outer peripheral surface of the fitting projection portion 44 of the plug-type optical connector 31, as best shown in FIGS. 6 and 7. Hole-like lock recesses 72 are formed in the corresponding lower side of the inner peripheral surface of the fitting recess 42 in the socket-type optical connector 34.

Figure 5:
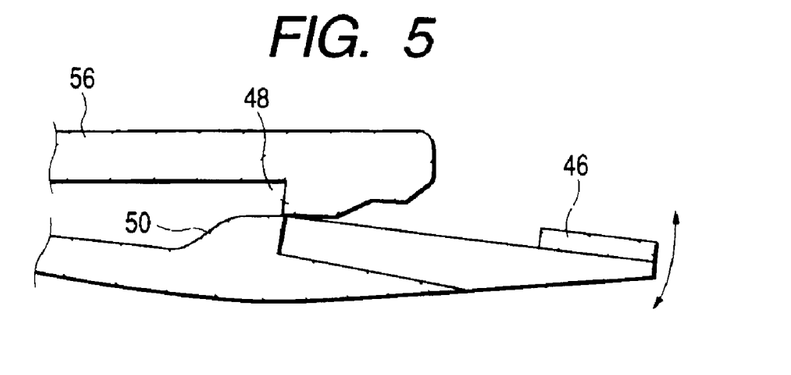
FIG. 5 is an explanatory view showing a condition immediately before the operation of retaining engagement between a latch retaining portion and a latch portion is completed.

The lock recesses 72 and lock projections 70 are of such an automatically-fitting structure that each lock recess 72 and the corresponding lock projection 70 are led in their mutually-fitting direction by the resilient force of the material (of which the plug-type optical connector 31 and the socket-type optical connector 34 are made) immediately before or after the retaining engagement of the latch portion 50 with the latch retaining portion 48 is completed at the time of fitting the fitting projection portion 44 in the fitting recess 42, as shown in FIG. 5.

As shown in FIG. 7, the length L of the lock projection 70 in the direction P of fitting of the fitting projection portion 44 is larger than the length S of the lock recess 72 in this fitting direction.

The lock projections 70 and the lock recesses 72 jointly form an auxiliary lock mechanism.

Guide grooves 74 each for guiding the sliding movement of the corresponding lock projection 70 during the fitting of the fitting projection portion 44 are formed in the lower surface of the fitting recess 42.

As the fitting projection portion 44 of the plug-type optical connector 31 is fitted into the fitting recess 42 in the socket-type optical connector 34, the two guide ridges 52 are guided along the two guide grooves 54, respectively, and thereafter the ferrule portions 40 are fitted into the ferrule portion-holding holes 66, respectively. Then, the engagement extension piece portion 46 is elastically deformed as shown in FIG. 5, and when the operation of retaining engagement between the upper-side latch portion 50 and latch retaining portion 48 is completed, each lower-side lock projection 70 is mostly fitted in the corresponding lock recess 72, and is in an automatically-fitting condition so as to be led in the fitting direction, as shown in FIG. 6.

Figure 4:
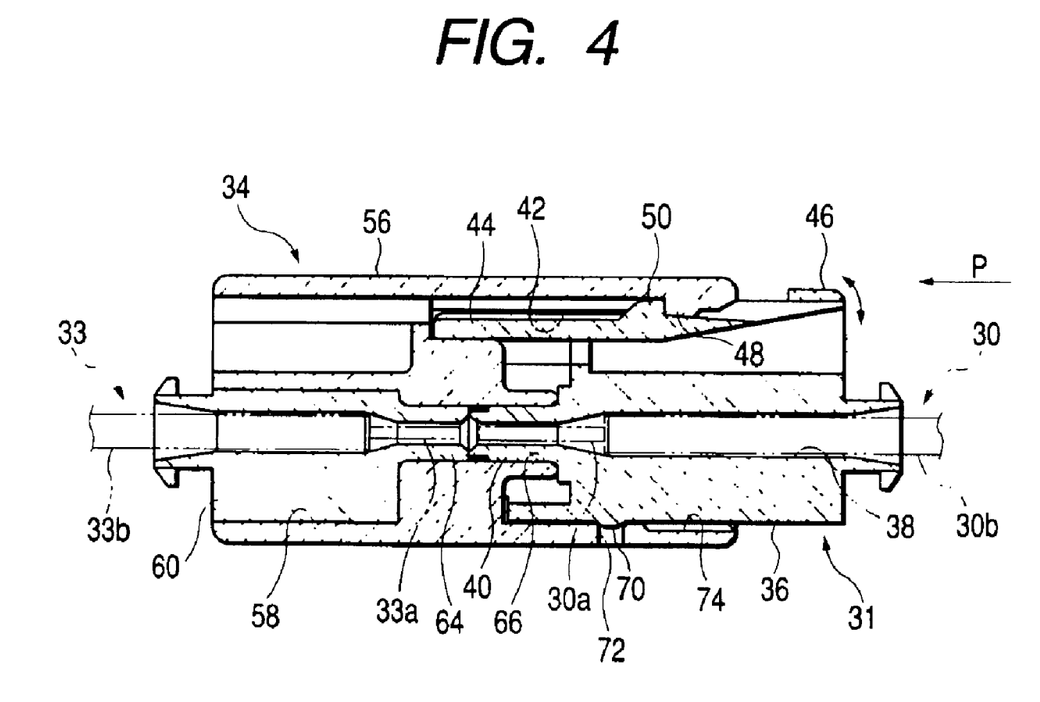
FIG. 4 is a cross-sectional view showing a fitted condition.

Then, when the latch portion 50 passes past the latch retaining portion 48, the engagement extension piece portion 46 is elastically restored, so that there is obtained the retained condition in which the latch portion 50 and the latch retaining portion 48 are locked to each other against disengagement from each other, as shown in FIG. 4. At this time, each lock projection 70 is completely fitted in the corresponding lock recess 72, so that the locked condition is also obtained at the lower side, as shown in FIG. 4.

In this fitted locked condition, within each ferrule portion-holding hole 66, the optical fiber 30a, held in the ferrule portion 40, and the optical fiber 33a, held in the ferrule portion 64, are abutted against each other in such a manner that the axes of these optical fibers 30a and 33a coincide with each other, and therefore the two optical fiber cords 30 and 33 are optically coupled together.

As described above, in this embodiment, the connected condition of the plug-type optical connector 31 and socket-type optical connector 34 is maintained not only by the retaining or locking engagement between the latch portion 50 and the latch retaining portion 48 (as in the conventional construction) but also by the locking engagement between each lock projection 70 and the corresponding lock recess 72, and therefore the two optical connectors are locked to each other at the plurality of portions, and with this construction the connected condition of the optical connectors 31 and 34 is more firm, and the mechanical strength in the locked condition can be increased, and besides a relative shaking movement between the optical connectors in the connected condition can be effectively prevented, and the light loss can be stabilized in the connected condition.

The auxiliary lock mechanism is constituted by the ridge-like lock projections 70 and the lock recesses 72 in which the lock projections 70 can be fitted, respectively, and these portions are not movable in contrast with the latch portion 50, and therefore the control of the dimensional tolerances is relatively easy, and in this respect, also, the light loss can be stabilized.

And besides, at the time when the operation of retaining engagement between the latch portion 50 and the latch retaining portion 48 is completed, each lock projection 70 is automatically fitted into the corresponding lock recess 72, and therefore in the condition in which the latch portion 50 is retainingly engaged with the latch retaining portion 48, the fitting projection portion 44 is urged in the fitting direction P by the automatically-fitting structure of the lock projections 70 and lock recesses 72, and in this respect, also, the relative shaking movement is effectively prevented, and besides the end surfaces of the two optical fibers 30a and 33a are urged in such a direction as to be abutted against each other, and the abutting distance can be reduced, and the light loss can be reduced and stabilized.

The length L of the lock projection 70 is larger than the length S of the lock recess 72, and therefore when the lock projection 70 is fitted in the lock recess 72, no gap is formed therebetween as shown in FIG. 7, so that the more firmly-locked condition is obtained, and each optical connector is effectively prevented from moving in the fitting direction P and the opposite direction, and in this respect, also, the relative shaking movement can be effectively prevented.

FIGS. 8 to 11 show a second embodiment, and those constituent portions, similar to those of the first embodiment, will be designated by identical reference numerals, respectively, and explanation thereof will be omitted.

Figure 8:
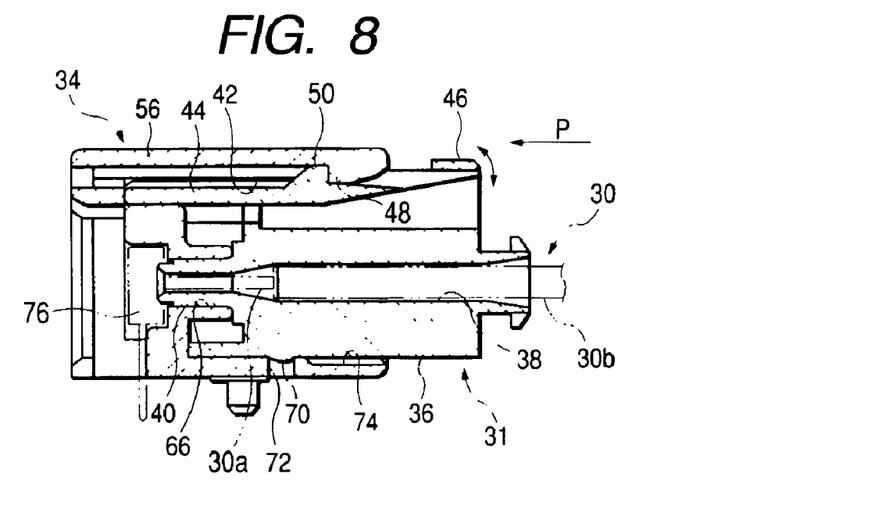
FIG. 8 is a cross-sectional view showing a second embodiment.

Namely, the first embodiment is directed to the relay optical connectors 31 and 34, in which each mating pair of optical fiber cords 30 and 33 are connected together, while this embodiment is directed to optical connectors 31 and 34 in which optical fiber cords 30 are optically coupled respectively to optical elements 76 such as a light-receiving element or a light-emitting element.

Figure 9:
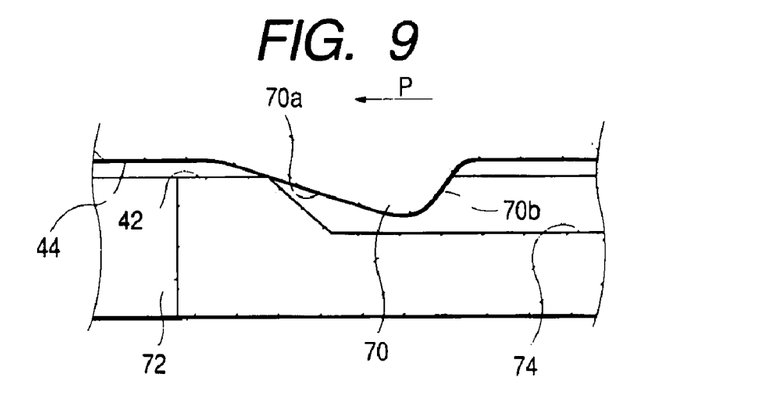
FIG. 9 is a view explanatory of the process of fitting a lock projection into a lock recess.
Figure 10:
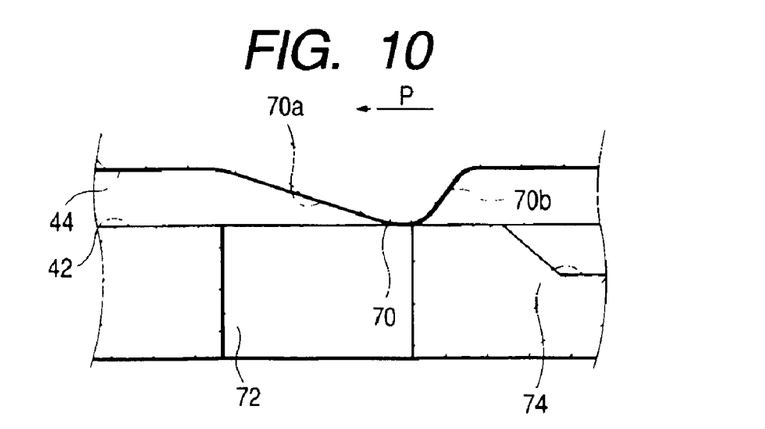
FIG. 10 is a view explanatory of the process of fitting the lock projection into the lock recess.
Figure 11:
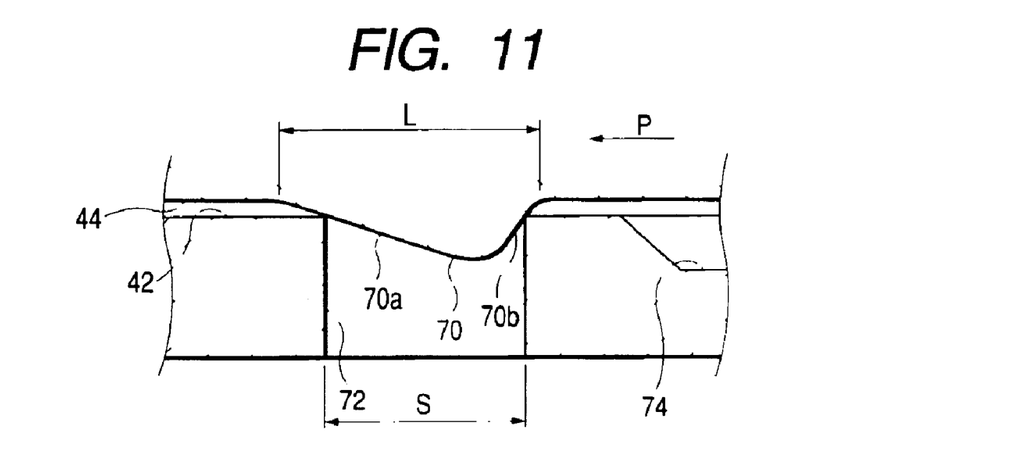
FIG. 11 is a view explanatory of the process of fitting the lock projection into the lock recess.

In this embodiment, as shown in FIGS. 9 to 11, each lock projection 70, formed in a bulged manner on a lower surface of a fitting projection portion 44, has such a shape that a front portion 70a of this lock projection 70 with respect to a direction P of fitting of the fitting projection portion 44 is gently slanting while a rear portion 70b thereof with respect to the fitting direction P is abruptly slanting. There is provided such an automatically-fitting structure that at the time when the retaining engagement of a latch portion 50 with a latch retaining portion 48 is completed, the abruptly-slanting rear portion 70b is disposed at a peripheral edge of a lock recess 72 as shown in FIG. 10, and the lock recess 72 and the lock projection 70 are led in their mutually-fitting direction.

Therefore, in this embodiment, when the fitting projection portion 44 of the plug-type optical connector 31 is fitted into a fitting recess 42 in the socket-type optical connector 34, the lock projections 70 are guided along guide grooves 74, respectively, and each lock projection is gently engaged with the lock recess portion because of the gently-slanting surface of the fitting direction (P)-front portion 70a, as shown in FIG. 9.

Then, at the time when the operation of retaining engagement between the latch portion 50 and the latch retaining portion 48 is completed, the lock projection is automatically led in the fitting direction P, so that the lock projection is abruptly fitted into the lock recess because of the abruptly-slanting surface of the fitting direction (P)-rear portion 70b.

Therefore, this embodiment achieves the effects similar to those of the first embodiment, and even when a pulling fore acts on the optical fiber cord 30 to apply a force tending to withdraw the optical connectors 31 and 34 from each other, the fitted condition is easily restored, and the increase of the light loss can be effectively prevented, and the light loss can be stabilized.

Figure 12:
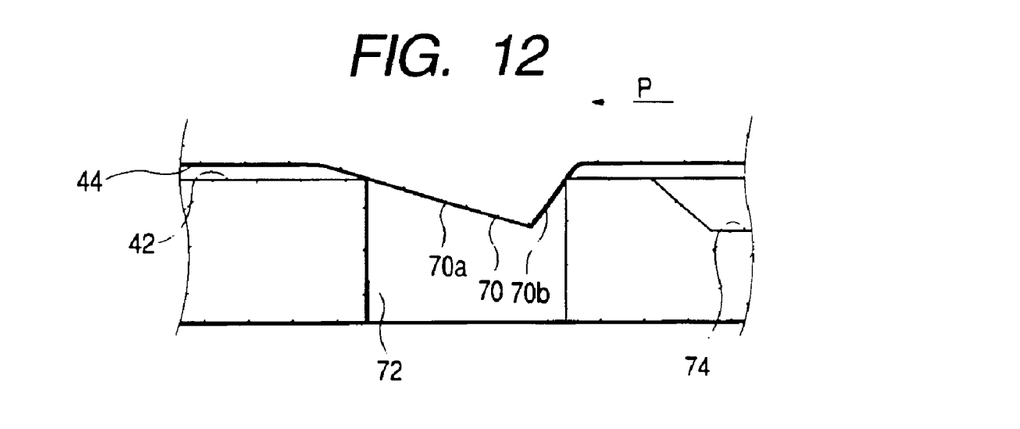
FIG. 12 is a cross-sectional view of an important portion of a third embodiment.

FIG. 12 shows a third embodiment, and those constituent portions, similar to those of the second embodiment, will be designated by identical reference numerals, respectively, and explanation thereof will be omitted.

Namely, in this embodiment, each of a gently-slanting front portion 70a and a steeply-slanting rear portion 70b of each lock projection 70 is formed into a straight configuration.

This embodiment achieves effects similar to those of the second embodiment.

Figure 13:
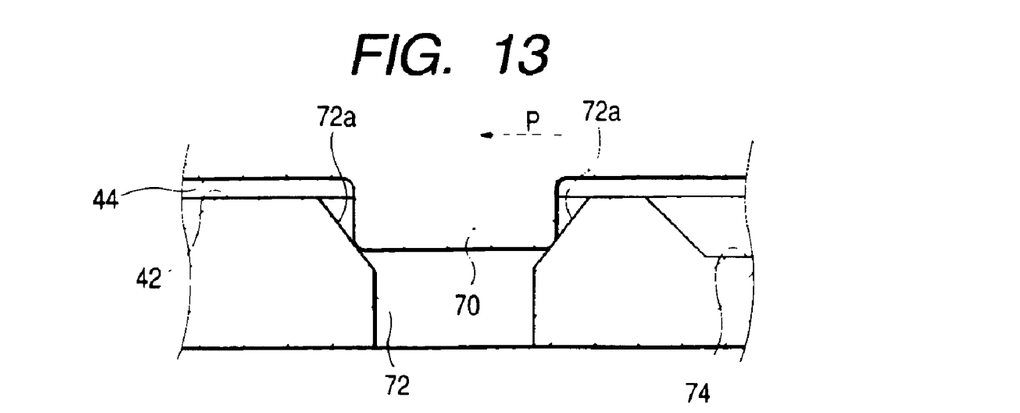
FIG. 13 is a cross-sectional view of an important portion of a fourth embodiment.

FIG. 13 shows a fourth embodiment, and those constituent portions, similar to those of the first embodiment, will be designated by identical reference numerals, respectively, and explanation thereof will be omitted.

Namely, in this embodiment, each lock projection 70 has a generally rectangular cross-section, and a peripheral edge portion of a corresponding lock recess 72 has slanting surfaces 72a which form the above automatically-fitting structure.

This embodiment also achieves effects similar to those of the first and second embodiments.

Although the optical connectors 31 and 34 of the above embodiments are of the two-pole type, the invention can be applied also to connectors of the single-pole or the multi-pole type.

As described above, in the optical connector device of the present invention, the auxiliary lock mechanism is provided between the inner peripheral surface of the fitting recess and the outer peripheral surface of the fitting projection portion, and the auxiliary lock mechanism includes the lock recess and the lock projection which are releasably fitted together when the latch portion is retainingly engaged in the latch retaining portion. Therefore, the two optical connectors are locked to each other at the plurality of portions, and with this construction the connected condition of the optical connectors is more firm, and the mechanical strength in the locked condition can be increased, and besides a relative shaking movement between the optical connectors in the connected condition can be effectively prevented, and the light loss can be stabilized in the connected condition. Furthermore, the auxiliary lock mechanism is constituted by the lock projection and the lock recess in which the lock projection can be fitted, and these portions are not movable, and therefore the control of the dimensional tolerances is relatively easy, and in this respect, also, there is achieved an advantage that the light loss can be stabilized.

The lock recess and the lock projection of the auxiliary lock mechanism have such an automatically-fitting structure that the lock recess and the lock projection are led in the mutually-fitting direction at the time when the operation of retaining engagement between the latch retaining portion and the latch portion is completed. In this case, when the latch portion is retainingly engaged with the latch retaining portion, the fitting projection portion is urged in the fitting direction, and in this respect, also, there is achieved an advantage that the relative shaking movement is effectively prevented, and besides there is achieved an advantage that the end surfaces of the two optical fibers or the like to be optically coupled together are urged in such a direction as to be abutted against each other, and the abutting distance can be reduced, and the light loss can be reduced and stabilized.

The length of the lock projection in the direction of fitting of the fitting projection portion is larger than the length of the lock recess. In this case, when the lock projection is fitted in the lock recess, no gap is formed therebetween, so that the more firmly-locked condition is obtained, each optical connector is effectively prevented from moving in the fitting direction and the opposite direction, and in this respect, also, there is achieved an advantage that the relative shaking movement can be effectively prevented.

The front portion of the lock projection with respect to the direction of fitting of the fitting projection portion is gently slanting while the rear portion of the lock projection with respect to the direction of fitting of the fitting projection portion is abruptly slanting. In this case, even when there is applied a force tending to withdraw the two optical connectors from each other, the fitted condition is easily restored, and the increase of the light loss can be effectively prevented, and in this respect, also, there is achieved an advantage that the light loss can be stabilized.

What is claimed is:

1. An optical connector device comprising:
   a socket-type optical connector having a fitting recess and a latch portion;
   a plug-type optical connector having a fitting projection portion and a latch retaining portion, the fitting projection portion to be fitted in the fitting recess, the latch retaining portion releasably engaged with the latch portion; and
   an auxiliary lock mechanism including a lock recess and a lock projection which are releasably fitted together when the latch portion is engaged in the latch retaining portion, wherein the auxiliary lock mechanism is provided between an inner peripheral surface of the fitting recess and an outer peripheral surface of the fitting projection portion; and
   an automatically-fitting structure for leading the lock recess and the lock projection in a mutually-fitting direction when an operation of retaining engagement between the latch retaining portion and the latch portion is to be completed.

2. The optical connector device according to claim 1, wherein a length of the lock projection in a direction of fitting of the fitting projection portion is larger than a length of the lock recess.

3. The optical connector device according to claim 1, wherein
   the lock projection has a front portion and a rear portion with respect to a direction of fitting of the fitting projection portion;
   the front portion is gently slanting; and
   the rear portion is steeply slanting.

4. An optical connector device, comprising:
   a socket-type optical connector having a fitting recess and a latch retaining portion;
   a plug-type optical connector having a fitting projection portion and a latch portion, the fitting projection portion to be fitted in the fitting recess, the latch retaining portion releasably engaged with the latch portion; and
   an auxiliary lock mechanism including a lock recess and a lock projection which are releasably fitted together when the latch portion is engaged in the latch retaining portion,
   wherein
   the auxiliary lock mechanism is provided between an inner peripheral surface of the fitting recess and an outer peripheral surface of the fitting projection portion; and
   an automatically-fitting structure for leading the lock recess and the lock projection in a mutually-fitting direction when an operation of retaining engagement between the latch retaining portion and the latch portion is to be completed.

5. The optical connector device according to claim 4, wherein a length of the lock projection in a direction of fitting of the fitting projection portion is larger than a length of the lock recess.

6. The optical connector device according to claim 4, wherein
   the lock projection has a front portion and a rear portion with respect to a direction of fitting of the fitting projection portion;
   the front portion is gently slanting; and
   the rear portion is steeply slanting.

* * * * *